US007614951B2

(12) United States Patent
Flemming et al.

(10) Patent No.: US 7,614,951 B2
(45) Date of Patent: Nov. 10, 2009

(54) GAMING MACHINE HAVING A PLURALITY OF MOVABLE ELEMENTS FOR INDICATING A GAME OUTCOME

(75) Inventors: Peter W. Flemming, Chicago, IL (US); Benjamin T. Gomez, Chicago, IL (US); Joel R. Jaffe, Evanston, IL (US); John D. Flint, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 831 days.

(21) Appl. No.: 10/442,389

(22) Filed: May 20, 2003

(65) Prior Publication Data

US 2004/0235556 A1 Nov. 25, 2004

(51) Int. Cl.
*A63F 13/00* (2006.01)

(52) U.S. Cl. .............................. 463/20; 463/16; 463/17; 463/22; 463/31; 273/141 R

(58) Field of Classification Search ............. 463/16–22, 463/31; 273/141
See application file for complete search history.

(56) References Cited

U.S. PATENT DOCUMENTS

| | | | | |
|---|---|---|---|---|
| 4,358,114 | A * | 11/1982 | Burnside | 273/143 R |
| 5,584,763 | A * | 12/1996 | Kelly et al. | 463/16 |
| 5,788,573 | A | 8/1998 | Baerlocher et al. | 463/16 |
| 5,823,874 | A | 10/1998 | Adams | 463/17 |
| 6,186,894 | B1 * | 2/2001 | Mayeroff | 463/20 |
| 6,270,411 | B1 | 8/2001 | Gura et al. | 463/20 |
| 6,315,660 | B1 | 11/2001 | DeMar et al. | 463/16 |
| 6,322,309 | B1 | 11/2001 | Thomas et al. | 413/20 |
| 6,336,863 | B1 | 1/2002 | Baerlocher et al. | 463/27 |
| 6,406,369 | B1 * | 6/2002 | Baerlocher et al. | 463/20 |
| 6,443,837 | B1 | 9/2002 | Jaffe et al. | 463/16 |
| 6,506,117 | B2 * | 1/2003 | DeMar et al. | 463/20 |
| 6,537,152 | B2 * | 3/2003 | Seelig et al. | 463/30 |
| 6,569,015 | B1 * | 5/2003 | Baerlocher et al. | 463/16 |
| 6,793,577 | B1 * | 9/2004 | Wilkins et al. | 463/16 |
| 6,893,018 | B2 * | 5/2005 | Inoue | 273/143 R |
| 6,905,407 | B2 * | 6/2005 | Nordman | 463/20 |

(Continued)

FOREIGN PATENT DOCUMENTS

DE GB 2201 821 A 9/1988

(Continued)

OTHER PUBLICATIONS

WMS Gaming Inc., "Big Bang Piggy Bankin"™, *Product Sheet*, (1997),1page.

(Continued)

*Primary Examiner*—Dmitry Suhol
*Assistant Examiner*—Sunit Pandya
(74) *Attorney, Agent, or Firm*—Nixon Peabody LLP

(57) ABSTRACT

According to one embodiment of the present invention, a gaming machine for conducting a wagering game comprises a plurality of indicia and a plurality of moveable elements. The plurality of indicia represent a plurality of possible game outcomes including a selected game outcome. The plurality of moveable elements move relative to the plurality of indicia and subsequently stop at one of the plurality of indicia to represent the selected game outcome.

36 Claims, 6 Drawing Sheets

U.S. PATENT DOCUMENTS

2004/0014521 A1* 1/2004 Seelig et al. .................. 463/20
2004/0048673 A1* 3/2004 Kaminkow .................. 463/46

FOREIGN PATENT DOCUMENTS

GB 2 096 376 10/1982 .................... 17/34
JP 2000167231 A 6/2000
WO WO 02/32524 A1 4/2002
WO WO 2004/025412 A2 3/2004

OTHER PUBLICATIONS

WMS Gaming Inc., "Palace of Riches"™, *Product Sheet*, (1998),1page.
WMS Gaming Inc., "Perfect Game"™, *Product Sheet*, (2000),1page.
WMS Gaming Inc., "Top Banana"™, *Product Sheet*, (1999),1page.
WMS Gaming Inc., "Top Cat Deluxe"™, *Product Sheet*, (1998),1page.

* cited by examiner

GAMING MACHINE HAVING A PLURALITY OF MOVABLE ELEMENTS FOR INDICATING A GAME OUTCOME

REFERENCE TO RELATED APPLICATIONS

This application is related to U.S. patent application Ser. No. 10/341,110 filed Jan. 13, 2003, entitled "Gaming Machine Having a Pendulum-Based Payout Indicator", and incorporated herein by reference in its entirety.

FIELD OF THE INVENTION

The present invention relates generally to gaming machines and, more particularly, to a gaming machine having moveable elements for indicating a game outcome.

BACKGROUND OF THE INVENTION

Gaming machines, such as slot machines, video poker machines and the like, have been a cornerstone of the gaming industry for many years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning on each machine is roughly the same (or believed to be the same), players are most likely to be attracted to the most entertaining and exciting machines. Shrewd operators constantly strive to employ the most entertaining and exciting machines available, because such machines attract frequent play and hence increase profitability to the operator.

One method of attracting players to gaming machines is by providing a visual indicator of a potential payout or a visual indicator of a winning outcome. For example, slot machines have reels with a plurality of symbols displayed thereon that rotate to align the symbols relative to a pay line according to one of a plurality of different outcomes. As the spinning reels slowly come to rest, the player begins to anticipate the outcome, which increases the entertainment provided to the player of the gaming machine.

Other methods of attracting players to gaming machines is by providing a bonus game in addition to a main game. Generally, bonus games provide a greater expectation of winning than the basic game alone and may be accompanied with more attractive or unusual features including visual features, audible features, or both. Because the visual payout indicator and the bonus game concepts have tremendous advantages in terms of player appeal and excitement relative to other known games, and because such games are attractive to both players and operators, there is a continuing need to develop gaming machines with new types of bonus games, visual indicators, or both, to satisfy the demands of players and operators. The present invention is directed to satisfying this need.

SUMMARY OF THE INVENTION

According to one embodiment of the present invention, a gaming machine for conducting a wagering game comprises a plurality of indicia and a plurality of moveable elements. The plurality of indicia represent a plurality of possible game outcomes including a selected game outcome. The plurality of moveable elements move relative to the plurality of indicia and subsequently stop at one of the plurality of indicia to represent the selected game outcome.

The above summary of the present invention is not intended to represent each embodiment, or every aspect, of the present invention. This is the purpose of the figures and the detailed description that follow.

Figure 1:
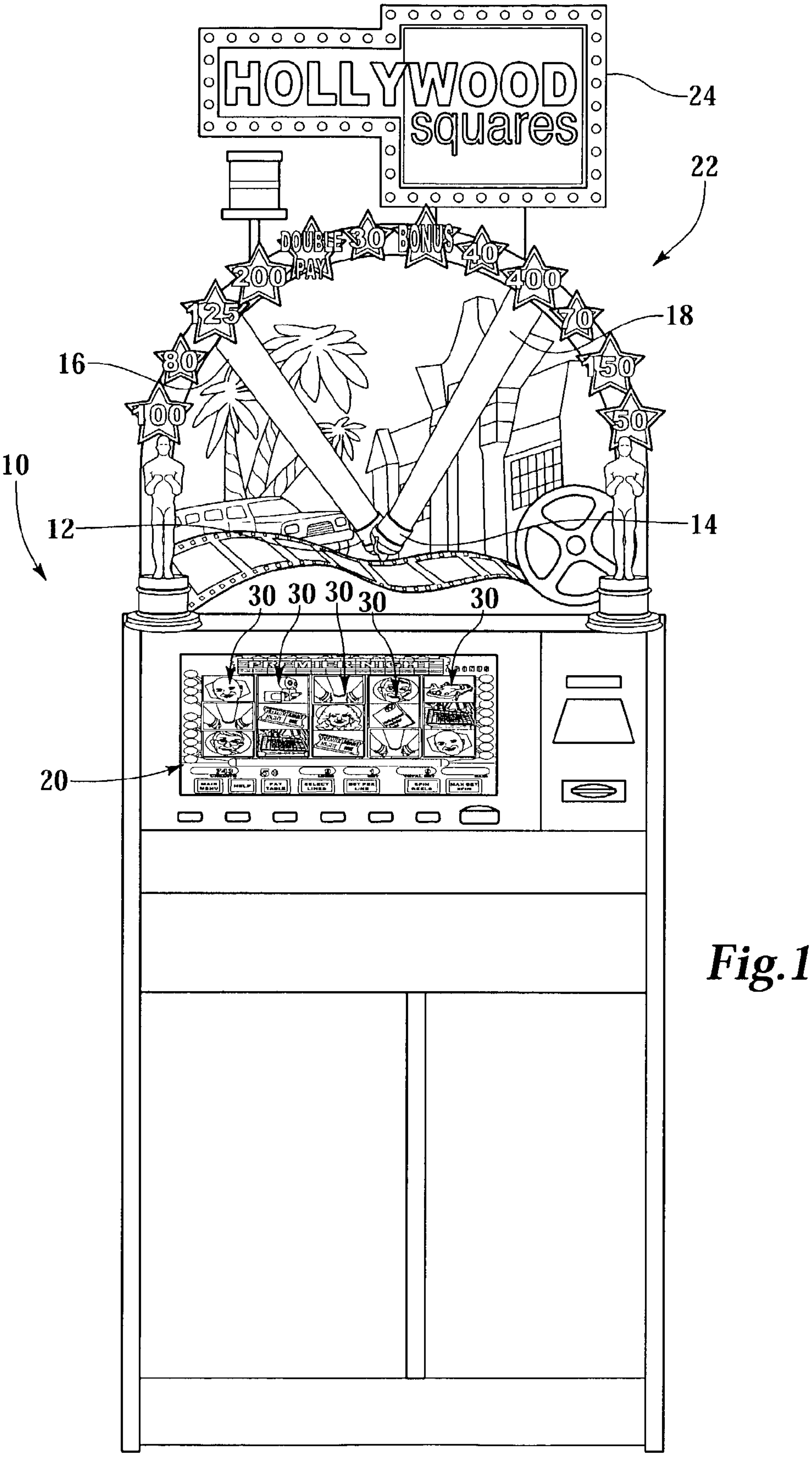
FIG. 1 is a perspective view of a gaming machine having moveable elements for indicating a game outcome according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF THE ILLUSTRATED EMBODIMENTS

Generally, the present invention is directed to gaming machines having a plurality of movable elements for indicating a game outcome. For example, according to one embodiment of the present invention, two moveable elements may comprise two searchlights emitting respective light beams that intersect to indicate a game outcome as is described in detail below. Alternatively, the plurality moveable elements may comprise two moving characters whose paths intersect to indicate a game outcome as is described in detail below.

Turning to the drawings and referring initially to FIG. 1, there is depicted a gaming machine 10 having two moveable elements for indicating a game outcome. The illustrated gaming machine 10 is a reel-slot-type gaming machine; however, the present invention is applicable to other types of gaming machines such as, for example, video poker machines. In the embodiment of the present invention illustrated in FIG. 1, the two moveable elements comprise first and second simulated searchlights 12, 14 that output first and second beams of light 16, 18. The light beams 16, 18 may be actual beams of light or may be simulated by using mechanical components, electromechanical components, or both in alternative embodiments of the present invention.

The gaming machine 10 includes a video display 20 and a top box unit 22 for playing both a "basic" game and a secondary or "bonus" game, respectively, according to one embodiment of the present invention. The depicted gaming machine 10 comprises a slant-top machine in which the video display 20 is angled towards a player of the gaming machine. It will be appreciated, however, that any of several other models of gaming machines are within the scope of the present invention such as, for example, an upright-version in which the video display 20 is generally vertical. The video display 20 may comprise a cathode ray tube (CRT) display, a liquid crystal display (LCD), a plasma display, or generally any other type of video display known in the art. The video display 20 has five spinning reels 30 displayed thereon. Alternatively, mechanical reels rather than displayed simulated reels may be used as is known in the art. The top box unit 22 of the gaming machine 10 also includes a marquee 24 that is reflective of a game theme for attracting players.

Figure 2:
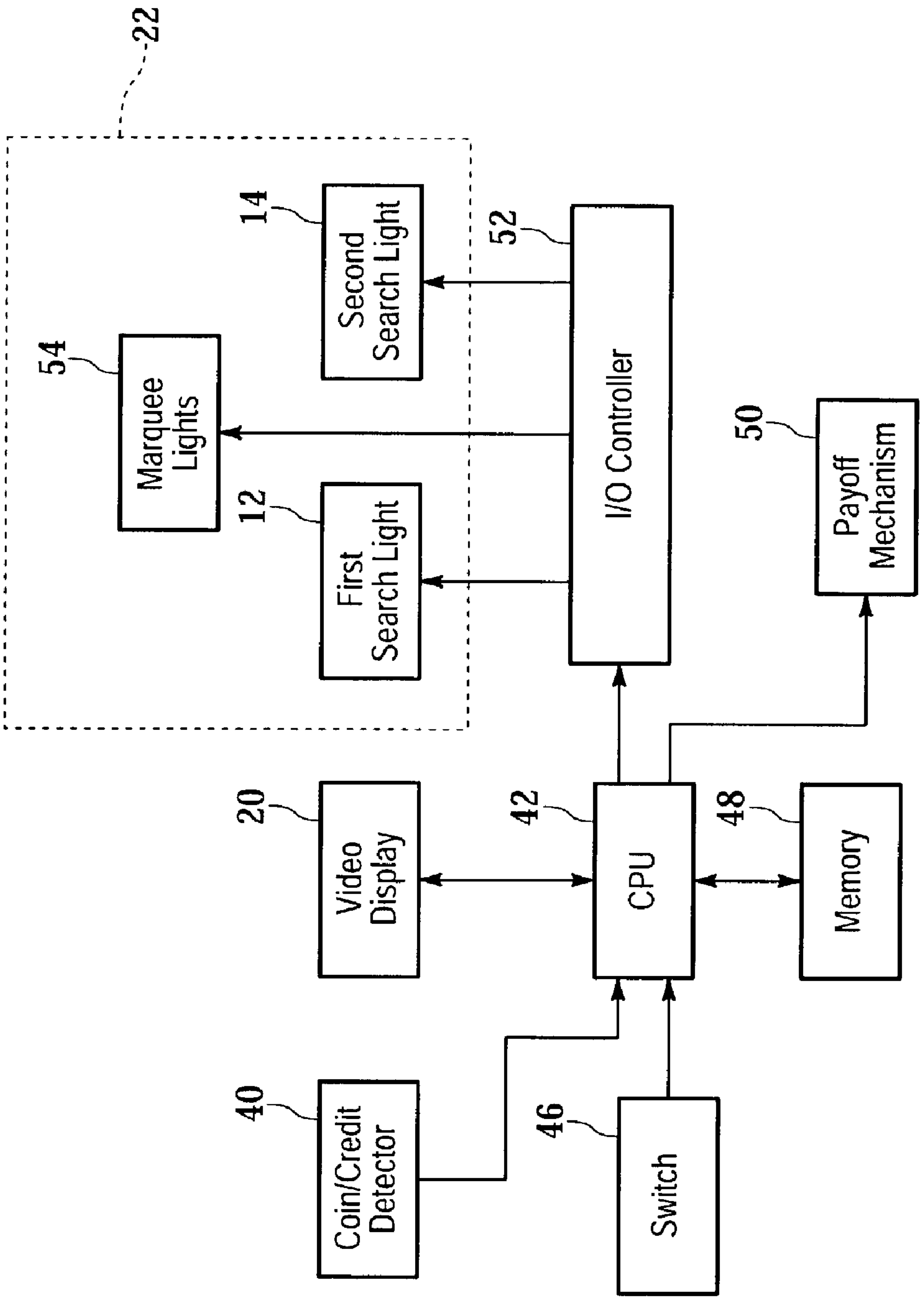
FIG. 2 is a control system for operating the gaming machine of FIG. 1.

Referring also to FIG. 2, a control system for operating the gaming machine 10 is illustrated according to one embodiment of the present invention. A coin/credit detector 40 signals a CPU 42 when a player has inserted a number of coins or has played a number of credits. The CPU 42 operates to execute a basic game program causing the video display 20 to display the basic game which includes the simulated spinning reels 30 with symbols displayed thereon.

Game play is initiated by a player inserting a number of coins into the "slot," inserting one or more currency bills into a bill accepting mechanism, or playing a number of credits, causing the CPU 42 or game controller to activate one or more pay lines on the display 20. The number of activated pay lines correspond to the number of credits played according to one embodiment. Pay line indicators 44 are displayed on both sides of the reels 30. For example, pay line indicators 44*a* and 44*b* indicate an activated horizontal center pay line extending between pay line indicators 44*a* and 44*b* in FIG. 3. The basic game commences in response to the player activating a switch 46 (e.g., by pulling a level or by pressing a button). Once the player activates the switch 46, the CPU 42 sets the reels 30 in motion on the video display 20, randomly selects a game outcome, and then stops the reels 30 relative to an activated pay line to display the symbols on the reels 30 according to the randomly selected game outcome.

A system memory 48 stores control software, operational instructions, and data associated with the gaming machine 10. A payoff mechanism 50 is operable in response to instructions from the CPU 42 to award a payoff of coins or credits to the player in response to certain winning outcomes, which may occur in the basic game or a bonus game, in accordance with a pay table stored in the system memory 48. A separate I/O controller 52 coupled to the CPU 42 operates the various features of the top box unit 22 including the first searchlight 12, the second searchlight 14, and marquee lights 54. Additional top box unit components such as audio components and other lighting elements may also be coupled to and controlled by the I/O controller 52. The first searchlight 12, the second searchlight 14, marquee 24, and marquee lights 54 may comprise physical, mechanical and/or electro-mechanical components or may be simulated on a video display of the top box unit 22 in alternative embodiments of the present invention.

Figure 3:
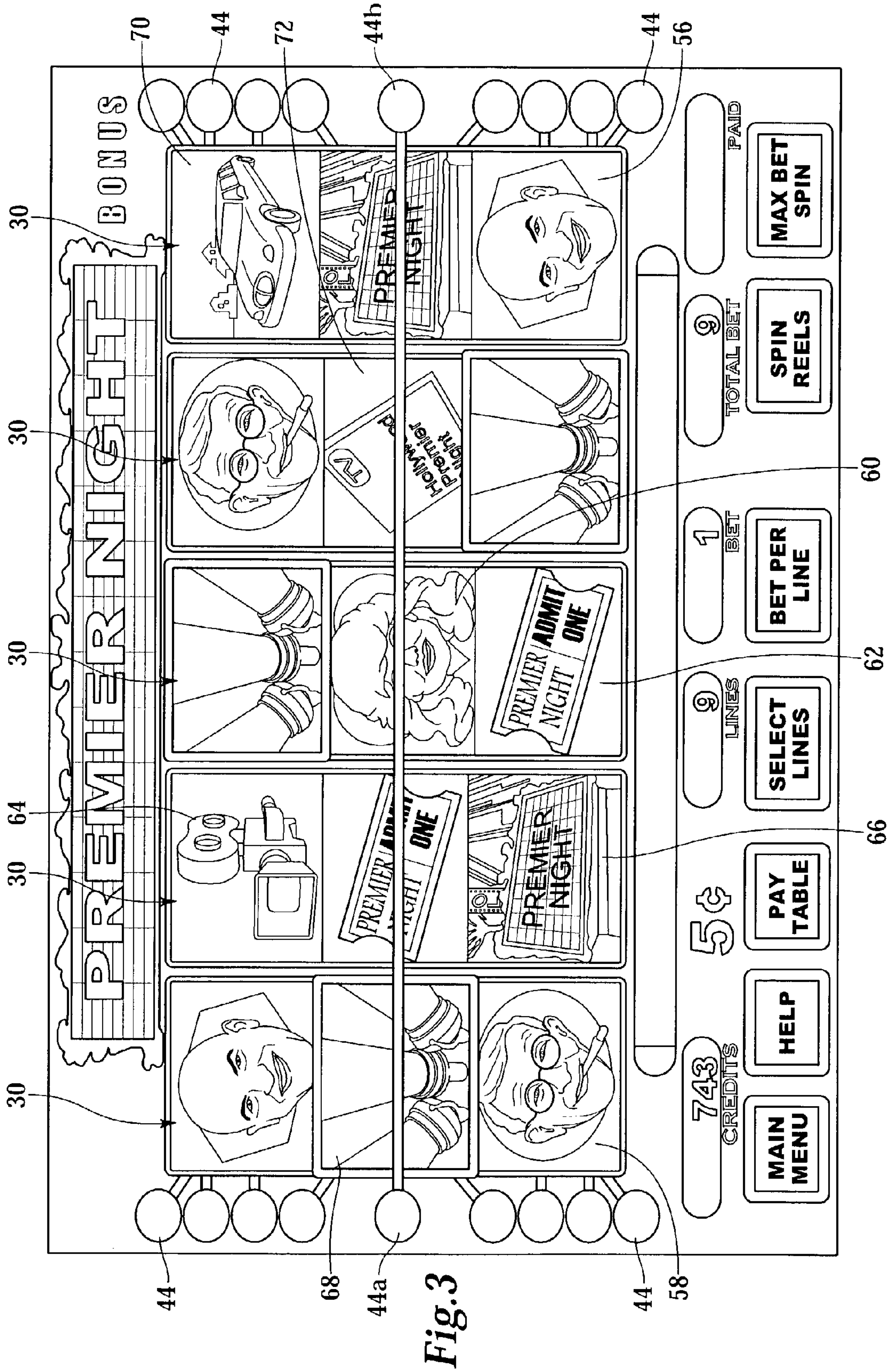
FIG. 3 is an oversized view of the reels of the gaming machine of FIG. 1.

Referring also to FIG. 3, an enlarged portion of the video display 20 is shown. According to the depicted embodiments, the video display 20 includes five reels 30 having symbols displayed thereon and one activated pay line extending between pay line indicators 44*a* and 44*b*. The depicted symbols on the five reels 30 include "TELLY SAVALAS" symbols 56, "GEORGE BURNS" symbols 58, "LONI ANDERSON" symbols 60, "TICKET" symbols 62, "CAMERA" symbols 64, "MARQUEE" symbols 66, "SEARCHLIGHT" symbols 68, "LIMOUSINE" symbols 70, and "TV GUIDE" symbols 72. As is apparent from the foregoing symbols 56-72 and from the marquee 24 (FIG. 1), the gaming machine 10 has a Hollywood theme. In other embodiments of the present invention, the gaming machine 10 may portray other themes with corresponding like-themed reel symbols. Further, standard gaming symbols such as "1-BAR" symbols, "2-BAR" symbols, "3-BAR" symbols, "CHERRY" symbols, "SEVEN" symbols, and "BELL" symbols may be depicted on the reels 30 in other embodiments.

A winning combination occurs when the symbols appearing on the reels 30 correspond to one of the winning symbol combinations listed in a pay table stored in the memory 48 of the gaming machine 10. Such winning combinations are displayed relative to one or more pay lines. The activated pay lines extend between activated pairs of pay line indicators 44 such as, for example, the pay line that extends between pay line indicators 44*a* and 44*b*. Winning combinations listed in the pay table can include three like-symbols appearing on a pay line yielding a first payout, and four like-symbols appearing on a pay line yield a second, larger payout. For example, three LONI ANDERSON symbols 60 appearing on a pay line yields five credits, and four LONI ANDERSON symbols 60 appearing on a pay line yields fifteen credits. The symbol types may be weighted according to the frequency at which they appear on the reels 30. For example, three TELLY SAVALAS symbols 56 on a pay line yields twenty credits whereas three GEORGE BURNS symbols 58 on a pay line yields thirty credits. Other schemes are implemented in various embodiments such as varying the winning amount for a particular symbol combination according to the particular pay line with which the symbol combination is aligned. For example, three CAMERA symbols 64 aligned with the first pay line 44*a*-44*b* may yield one hundred credits, while three TICKET symbols 62 aligned with a second or third pay line may yield five hundred credits. Many other symbol combinations relative to the plurality of pay lines and corresponding payouts are listed in the pay table stored in the memory 48 of the gaming machine 10.

Other outcomes cause the CPU 42 to initiate a bonus game and the CPU 42 switches from operating in a basic mode to operating in a bonus mode. For example, as illustrated in FIG. 3, the CPU 42 initiates a bonus game when three or more SEARCHLIGHT symbols 68 are displayed on the video display 20. Alternatively, a bonus game is triggered when a bonus game-triggering symbol is displayed on a specific reel 30 and is aligned with a pay line—e.g., a SEARCHLIGHT symbol 68 on the first reel 30 is aligned with the activated pay line 44*a*-44*b*. Alternatively, the CPU 42 only initiates the bonus game when a player has wagered a predetermined number of credits (e.g., the maximum number of credits) and a bonus-game-triggering symbol is displayed on a specific reel 30 and is aligned with a specific pay line. The latter embodiment encourages players to wager the maximum number of credits. One or more of many different combinations of symbols 56-72, reels 30, pay lines, number of credits wagered, or combinations thereof may be used to trigger the bonus round. The bonus game generally supplements the payoff in the pay table corresponding to the symbol combination on the reels.

Figure 5:
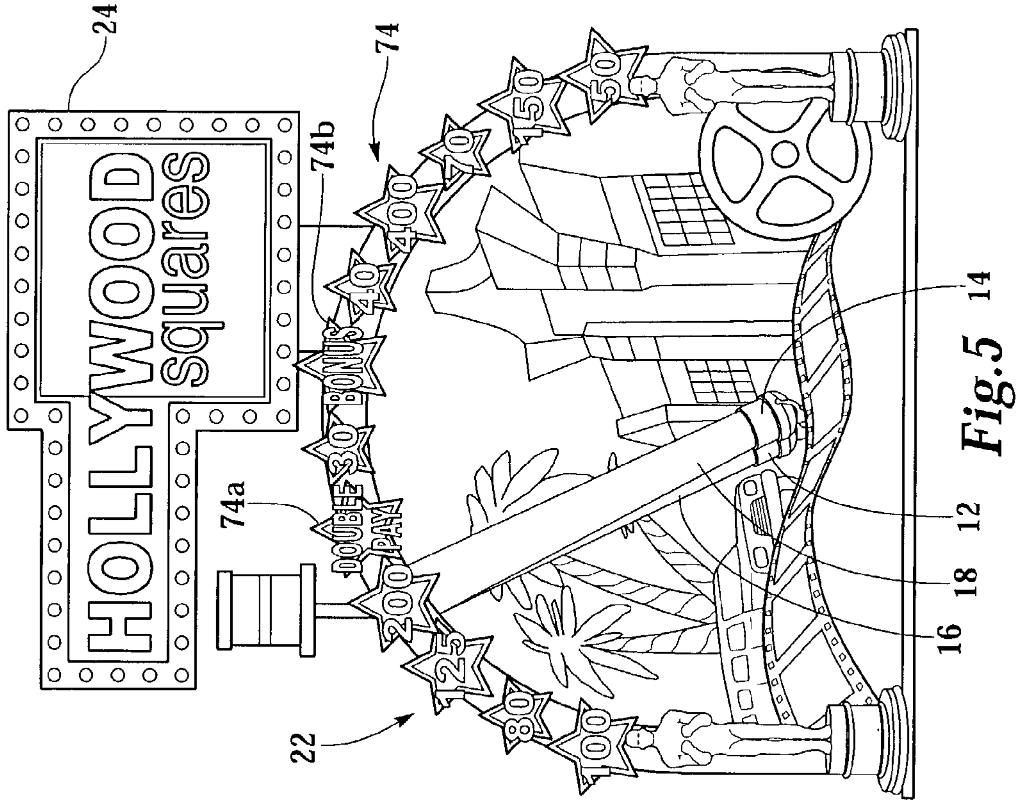
FIGS. 4 and 5 are oversized views of the top box unit of the gaming machine of FIG. 1.
Figure 4:
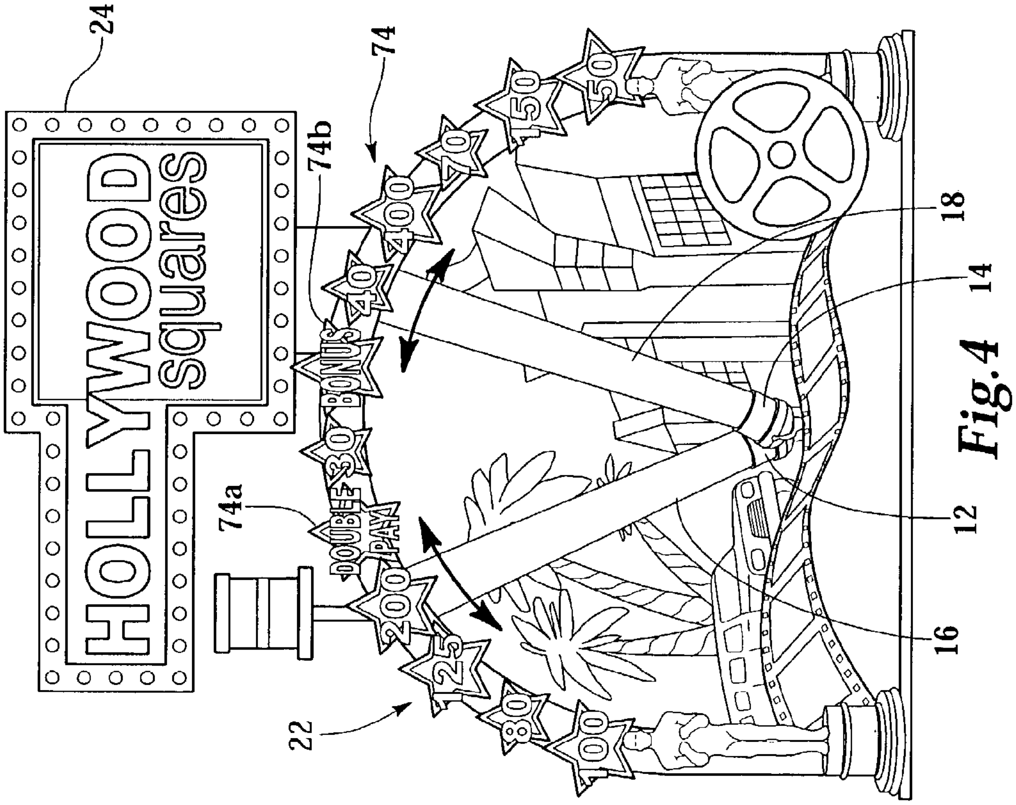

Turning now to FIGS. 4 and 5, the CPU 42 activates the top box unit 22 of the gaming machine 10 upon initiation of the bonus game. Generally, in the bonus round, the first and second searchlights 14, 16 oscillate with their respective light beams 16, 18 crossing paths several times and randomly stop such that the light beams 16, 18 illuminate, or point to, the same displayed payoff symbol of the bonus round, or the "bonus payoff." In the bonus round, the bonus payoff is randomly determined by the CPU 42, which then directs the I/O controller 52 to operate the searchlights 12, 14. To attract the player's attention to the top box unit 22, the display 20 of the gaming machine 10 that displays the basic game may be dimmed. As previously discussed, the top box unit 22 is Hollywood-themed according to the depicted embodiment and includes the Hollywood Squares marquee 24. The Hollywood-themed components of the top box unit 22 include the first and second searchlights 12, 14, the Hollywood Square marquee 24, and the background art of the top box unit 22. These Hollywood-themed components may comprise physical, mechanical and/or electro-mechanical components, or may be simulated on a video display of the top box unit 22.

The top box unit 22 includes a plurality of symbols 74, or indicia, that represent a plurality of possible bonus game outcomes. For example, the "200" symbol in the plurality of top box symbols 74 represents a bonus game payout of two-hundred credits. In the depicted embodiment, the plurality of top box symbols 74 are arrayed along an arcuate path towards the top of the top box unit 22. In alternative embodiments, the plurality of top box symbols 74 are arranged in a variety of fashions.

The CPU 42 directs the I/O controller 52 to operate the top box unit 22 including the searchlights 12, 14, and the marquee lights 42 as well as to output audible signals and other lighting consistent with the Hollywood theme. For example, the gaming machine 10 outputs sounds simulating the theme song from the Hollywood squares television program. In addition to the marquee lights 54, other lighting for the top box unit may include lighting (e.g., back lighting) for the plurality top box symbols 74 and for the art work displayed on the top box unit 22. When the gaming machine 10 is not in use (i.e., not being played by a player), the CPU 42 causes the gaming machine 10 to enter an attract mode. In the attract mode, the CPU 42 directs the I/O controller 52 to operate the top box unit 22 in a predetermined fashion by flashing the lights and outputting sounds designed to attract players to the gaming machine 10.

According to one embodiment of the present invention, three SEARCHLIGHT symbols 68 on the video display 20 in the main game triggers the bonus round as is shown in FIG. 3. Once the bonus round is triggered, the CPU 42 randomly selects a bonus game outcome that is represented by one of the plurality of top box symbols 74 at which the searchlights will stop. The CPU 42 then directs the I/O controller 52 to set the first searchlight 12 and the second searchlight 14 in reciprocating motion such that their respective beams randomly move back and forth relative to the arcuate path illuminating the top box symbols 74 as shown in FIG. 4. Finally, the CPU 42 decelerates and stops the first and second searchlights 12, 14 to indicate the predetermined game outcome such that their beams illuminate, i.e., are positioned at, the same top box symbol 74, which corresponds to the randomly selected bonus game outcome determined by the CPU 42, as is shown in FIG. 5. The CPU 42 operates the payoff mechanism 50 to award a payoff of coins or credits to the player in response to the bonus game outcome. For example, if the searchlights 12, 14 are stopped at the "200" symbol in the plurality of top box symbols 74 as shown in FIG. 5, a payoff of two-hundred credits is awarded to the user.

A variety of parameters of the top box unit 22 can be varied in alternative embodiments of the present invention. For example, the time of movement of the searchlights 12, 14 or the number of sweeps each searchlight 12, 14 makes along the top box symbols 74 can be varied. Further, while the illustrated gaming machine shows two searchlights 12, 14, any number of searchlights (e.g., three, four, or five searchlights) can be used for indicating a game outcome in alternative embodiments of the present invention.

While the majority of the top box symbols 74 are indicative of a payout or credit amount, other symbols such as a "DOUBLE PAY" symbol 74*a* or a "BONUS" symbol 74*b* may be included in the top box symbols 74. In a bonus game, when the two searchlights 12, 14 indicate the DOUBLE PAY symbol 74*a*, the outcome from the previous or subsequent play on the main game is doubled, or in the bonus game, in one embodiment of the present invention; other symbols can triple, quadruple, etc. the bonus or main game payout. The BONUS symbol 74*b* triggers an additional bonus game different than the above-described searchlight bonus game, triggers an additional searchlight bonus game wherein a multiplier (e.g., two-, three-, or four-times) is introduced, or represents a different game outcome such as a free spin or play in alternative embodiments of the present invention. In other alternative embodiments, many different top box symbols can be used to represent many different game outcomes including payout amounts, multipliers, or other game outcomes.

Figure 6:
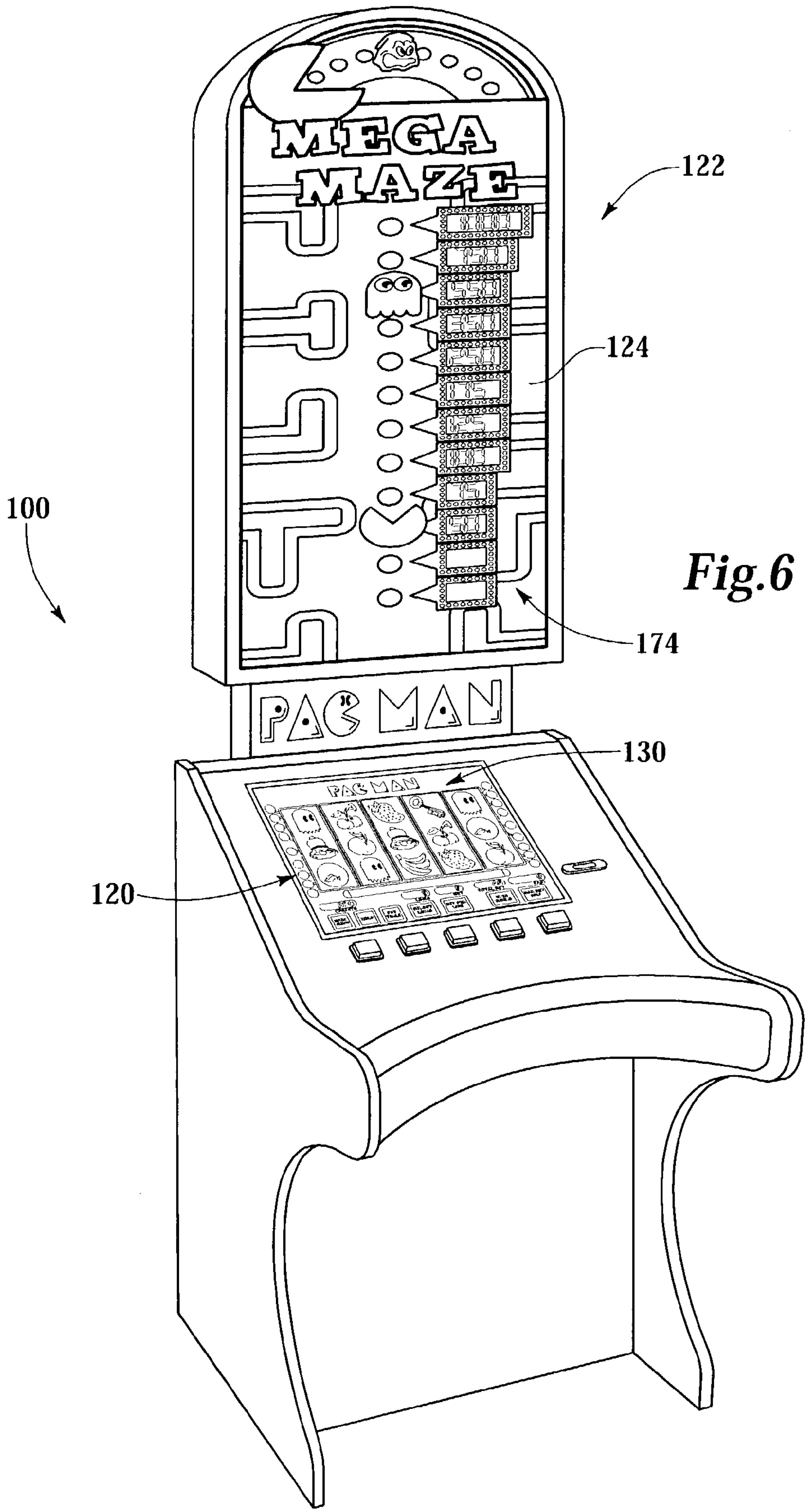
FIG. 6 is a perspective view of a gaming machine having moveable elements for indicating a game outcome according to another embodiment of the present invention.

Referring now to FIG. 6, a gaming machine 100 having two moveable elements for indicating a game outcome is shown according to an alternative embodiment of the present invention. The gaming machine 100 operates in many respects similar to the gaming machine 10 discussed in connection with FIGS. 1-3. The gaming machine 100 includes a video display 120 and a top box unit 122 comprising a top box video display 124 for playing both a basic game and a bonus game, respectively, according to one embodiment of the present invention. Alternatively, one or both of the lower and upper video displays 120, 124 can be used in the main game, the bonus game, or both. As discussed above in connection with FIGS. 1-3, the top box unit 122 may include video components such as one or more video displays, mechanical components, electromechanical components, or a combination thereof.

As discussed above in connection with FIG. 2, the gaming machine's CPU 42 operates to execute a basic game program causing the video display 120 to display the basic game that includes simulated spinning reels 130 having a plurality of symbols displayed thereon. Once game play is commenced, the CPU 42 stops the spinning reels according to a randomly selected game outcome. Certain game outcomes are winning outcomes and those winning outcomes are listed in a pay table stored in memory of the gaming machine. Other game outcomes, which are also stored in the memory 48, include bonus-game-triggering outcomes—also referred to start-bonus outcomes or special outcomes—as discussed in connection with FIGS. 1-5 that cause the CPU 42 to operate pursuant to a bonus game mode of operation.

Figure 7:
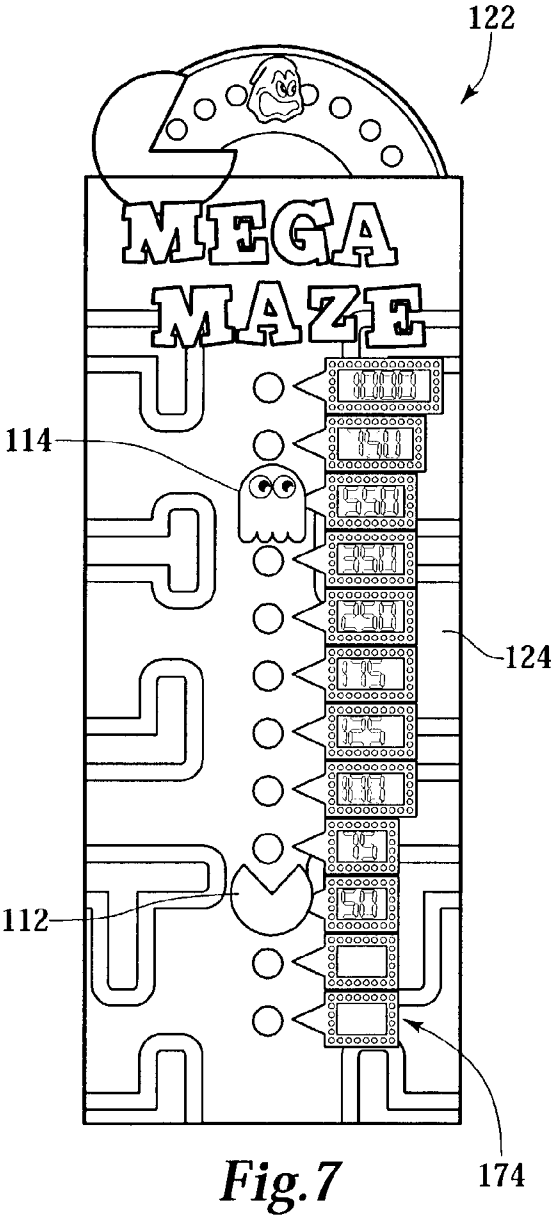
FIGS. 7 and 8 are oversized views of the top box unit of the gaming machine of FIG. 6.
Figure 8:
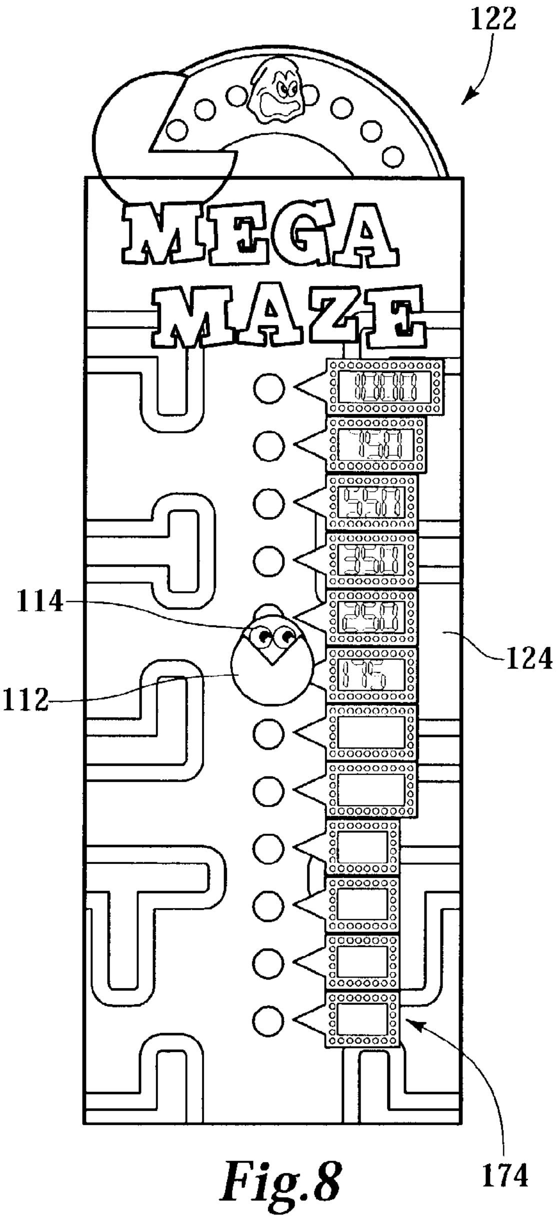

Turning to FIGS. 7 and 8, the top unit includes a first character 112 and a second character 114 that move to indicate a game outcome. As is apparent from FIGS. 6-8, the gaming machine 100, including the first and second characters 112, 114, have a Pac Man arcade game theme. The first character 112 comprises a Pac-Man character and the second character 114 comprises a ghost, or monster, character. In response to a bonus-game-trigging outcome in the main game, the CPU 42 directs the I/O controller 52 (FIG. 2) to operate the top box unit 122, including the upper video display 124, pursuant to the bonus game mode of operation. The top box unit 122 includes a plurality of top box symbols 174, which represents a plurality of payoff amounts in the depicted embodiment.

Once the bonus round commences, the CPU 42 randomly selects a bonus game outcome and then directs the I/O controller 52 to set the first moveable character 112 and the second moveable character 114 in motion along the plurality of top box symbols 174 as shown in FIG. 7. As discussed above, the first and second moveable characters 112, 114 can comprise physical mechanical and/or electro-mechanical components, or can be displayed on the top box video display 124 in alternative embodiments of the present invention. The I/O controller 52 stops the first and second moveable characters 112, 114 at the top box symbol 174 representing the randomly selected bonus game outcome as shown in FIG. 8.

The I/O controller 52 may stop the moveable characters 112, 114 at the top box symbol 174 representing the randomly selected bonus game outcome without having the characters 112, 114 pass by each other or after making several passes. Additionally or alternatively, the characters 112, 114 may commence movement in the same direction, the opposite direction, towards each other, or away from each other. Further, in alternative embodiments, the characters 112, 114 may commence movement one after the other or at the same time and may terminate movement one after the other or at the same time. Further still, the characters 112, 114 may move for a predetermined amount of time, or a randomly selected amount of time within a predetermined range, prior to stopping. In the depicted embodiment, the illuminated symbols 174 that the Pac Man symbol 112 has moved past are dimmed or turned-off. In other embodiments, the path along which the characters travel 112, 114, and eventually meet, can be most any shape in addition to the substantially linear path shown in FIGS. 6-8. Further, the plurality of top box symbols may be disposed in an array comprising a number of rows and a number of columns. Additionally or alternatively, more than two moveable characters may be used to indicate the bonus game outcome. The top box symbols 174 included in FIGS. 6-8 represent payout amounts. Additionally or alternatively, other top box symbols 174 representing other outcomes such, for example, as multipliers, free spins, etc. are used in alternative embodiments of the gaming machine 100.

In yet another alternative embodiment, the I/O controller 52 moves the first and second characters 112, 114 a specific amount in response to player input. For example, the lower video display 120 may display a plurality of player-selectable symbols each of which represent a specific distance (e.g., one, two, or three spaces) that each character 112, 114 moves. Prior to selection by the user, the distance would remain unknown to the player. Subsequent to selection, the symbol is "turned over" revealing the distance that each character is moved by the I/O controller 52.

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A gaming machine for conducting a wagering game, comprising:

a plurality of fixed indicia, each of the plurality of fixed indicia representing one of a plurality of distinct game outcomes;

a controller to select a single game outcome from the plurality of distinct game outcomes; and a plurality of moveable elements for moving independently of each other relative to the plurality of fixed indicia and for subsequently only randomly stopping at a same one of the plurality of fixed indicia representing the selected single game outcome.

2. The gaming machine of claim 1 wherein the selected single game outcome is associated with a bonus game of the gaming machine.

3. The gaming machine of claim 1 wherein the selected single game outcome is associated with a main game of the gaming machine.

4. The gaming machine of claim 1 wherein the plurality of moveable elements are physical, electro-mechanical elements.

5. The gaming machine of claim 1 wherein the plurality of moveable elements are graphically depicted on a video display.

6. The gaming machine of claim 1 wherein the gaming machine is Hollywood-themed.

7. The gaming machine of claim 6 wherein at least one of the plurality of moveable elements is a searchlight.

8. The gaming machine of claim 1 wherein the gaming machine is arcade-game themed.

9. The gaming machine of claim 8 wherein at least one of the plurality of moveable elements depicts a character corresponding to the arcade game.

10. The gaming machine of claim 1 wherein the plurality of fixed indicia include respective payouts.

11. The gaming machine of claim 10 wherein the plurality of moveable elements stop at or near one of the payouts for indicating the single selected game outcome.

12. The gaming machine of claim 11 wherein the plurality of fixed indicia are depicted on a video display.

13. The gaming machine of claim 12 wherein the video display is included in a top box unit of the gaming machine.

14. A method of operating a gaming machine under the control of a central processing unit in a basic game mode and a bonus game mode, the gaming machine including first and second moveable elements for indicating one of a plurality of fixed indicia, each representing a single one of a plurality of distinct bonus game outcomes, the method comprising:

receiving a wager from a player of the gaming machine;

operating the gaming machine pursuant to the basic game mode;

selecting, under control of the central processing unit, a basic game outcome from a plurality of distinct basic game outcomes that include a start-bonus game outcome;

operating the gaming machine pursuant to the bonus game mode when the start-bonus game outcome is selected;

selecting, under control of the central processing unit, a single bonus game outcome from the plurality of possible bonus game outcomes when operating pursuant to the bonus game mode;

moving the first moveable element and the second moveable element relative to the plurality of fixed indicia and independently of each other; and only randomly stopping the first moveable element and the second moveable element at a same one of the plurality of fixed indicia representing the selected single bonus game outcome.

15. The method of claim 14 wherein the moving step comprises moving the first moveable element in a first direction relative to the plurality of fixed indicia and moving the second element in a second direction relative to the plurality of fixed indicia.

16. The method of claim 15 wherein the first direction is different than the second direction.

17. The method of claim 15 wherein the first direction is opposite the second direction.

18. The method of claim 14 wherein the moving step comprises moving the first and second moveable elements for a predetermined amount of time.

19. The method of claim 14 wherein the moving step comprises moving the first and second moveable elements past each other at least one time.

20. A method of operating a gaming machine comprising:

receiving a wager from a player of the gaming machine;

operating the gaming machine, under the control of a central processing unit, in response to receipt of the wager;

selecting, under control of the central processing unit, a single game outcome from a plurality of distinct game outcomes;

moving a first moveable element and a second moveable element independently of each other and relative to a plurality of fixed indicia indicative of the plurality of distinct game outcomes; and only randomly stopping the first moveable element and the second moveable element at a same one of the plurality of indicia indicative of the selected single game outcome.

21. The method of claim 20 wherein the operating step comprises operating the machine pursuant to a basic game.

22. The method of claim 20 wherein the operating step comprises operating the gaming machine pursuant to a bonus game.

23. The method of claim 20 wherein the moving step comprises moving the first moveable element in a first direction relative to the plurality of fixed indicia and moving the second element in a second direction relative to the plurality of fixed indicia.

24. The method of claim 23 wherein the first direction is different than the second direction.

25. The method of claim 23 wherein the first direction is opposite the second direction.

26. The method of claim 20 wherein the moving step comprises moving the first and second moveable elements for a predetermined amount of time.

27. The method of claim 20 wherein the moving step comprises moving the first and second moveable elements past each other at least one time.

28. A method of conducting a wagering game on a gaming machine, comprising:

receiving a wager from a player to play the wagering game;

moving a plurality of moveable elements relative to a plurality of fixed indicia and moving the plurality of moveable elements independently of each other in a reciprocal manner;

selecting a single game outcome from a plurality of distinct game outcomes, the single game outcome being only a single one of the plurality of fixed indicia;

randomly stopping the plurality of moveable elements at the selected single one of the plurality of indicia; and providing the single game outcome indicated by the one of the fixed indicia.

29. The method of claim 28 wherein the single game outcome includes a payout.

30. The method of claim 28 wherein the plurality of fixed indicia include respective payouts.

31. The method of claim 28 wherein the plurality of moveable elements include first and second moveable elements, and wherein the moving step includes moving the first and second moveable elements in opposite directions.

32. The method of claim 28 wherein the wagering game includes a basic game and a bonus game triggered by a special outcome in the basic game, and wherein the moving, stopping, and providing steps occur in the bonus game.

33. The method of claim 28 wherein one or more of the plurality of moveable elements are physical, electro-mechanical elements.

34. The method of claim 28 wherein one or more of the plurality of moveable elements are graphically displayed on a video display.

35. The method of claim 28 wherein the moving step includes moving the plurality of moveable elements along an arcuate path.

36. The method of claim 28 wherein the moving step includes moving the plurality of moveable elements along a linear path.

* * * * *

UNITED STATES PATENT AND TRADEMARK OFFICE

CERTIFICATE OF CORRECTION

PATENT NO. : 7,614,951 B2
APPLICATION NO. : 10/442389
DATED : November 10, 2009
INVENTOR(S) : Flemming et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this

Nineteenth Day of October, 2010

David J. Kappos
*Director of the United States Patent and Trademark Office*